United States Patent
Lavoie et al.

(10) Patent No.: US 11,568,685 B2
(45) Date of Patent: Jan. 31, 2023

(54) SYSTEMS AND METHODS TO CALIBRATE A HANDHELD DEVICE USED FOR REMOTELY CONTROLLING A VEHICLE

(71) Applicant: Ford Global Technologies, LLC, Dearborn, MI (US)

(72) Inventors: Erick Michael Lavoie, Van Buren Charter Township, MI (US); Armin Mueller-Lerwe, Kerpen-Bergerhausen (DE); Yuliya Aksyutina, Jülich (DE); Christoph Hirner, Dormagen (DE); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 230 days.

(21) Appl. No.: 16/986,126

(22) Filed: Aug. 5, 2020

(65) Prior Publication Data
US 2022/0044501 A1 Feb. 10, 2022

(51) Int. Cl.
*G07C 5/08* (2006.01)
*G05D 1/00* (2006.01)

(52) U.S. Cl.
CPC ......... *G07C 5/0808* (2013.01); *G05D 1/0016* (2013.01)

(58) Field of Classification Search
CPC ............... G07C 5/0808; G05D 1/0016; G05D 2201/0213; B62D 15/0285; H04M 1/72415; H04M 1/24; H04M 1/72454; H04L 43/0852
See application file for complete search history.

(56) References Cited

U.S. PATENT DOCUMENTS

| | | |
|---|---|---|
| 2017/0308075 A1 | 10/2017 | Whitaker et al. |
| 2018/0105165 A1 | 4/2018 | Alarcon et al. |
| 2019/0152472 A1 | 5/2019 | Aksyutina et al. |

FOREIGN PATENT DOCUMENTS

| | | | | |
|---|---|---|---|---|
| DE | 102015221811 A1 | 11/2015 | | |
| DE | 102016226008 A1 | 12/2016 | | |
| WO | WO-2005106703 A2 | * 11/2005 | ......... | F02D 41/1497 |
| WO | WO-2006056355 A2 | * 6/2006 | ............ | F02D 11/107 |
| WO | WO-2017211593 A1 | * 12/2017 | | |

* cited by examiner

*Primary Examiner* — Joseph J Dallo
(74) *Attorney, Agent, or Firm* — Frank Lollo; Eversheds Sutherland (US) LLP (57) ABSTRACT

The disclosure is generally directed to systems and methods for calibrating a handheld device used for controlling a partially autonomous vehicle. An example method to calibrate the handheld device may include entering a remote-control command into the handheld device for controlling a first action performed by the partially autonomous vehicle. A time-delay associated with one or more operations executed in the handheld device in response to entering the remote-control command are then measured. The time-delay is conveyed to a cloud computing device, which evaluates the time-delay and returns a diagnostic result to the handheld device. Evaluation of the time-delay by the cloud computing device may be carried out by comparing the time-delay in the handheld device to time-delay values obtained via crowdsourcing from other handheld devices. The diagnostic result provided by the cloud computing device may be used by the handheld device for calibration purposes.

20 Claims, 5 Drawing Sheets

SYSTEMS AND METHODS TO CALIBRATE A HANDHELD DEVICE USED FOR REMOTELY CONTROLLING A VEHICLE

FIELD OF THE DISCLOSURE

This disclosure generally relates to vehicles, and more particularly relates to systems and methods to calibrate a handheld device that is used for remotely controlling a vehicle.

BACKGROUND

Despite significant developmental efforts in vehicle automation, many vehicles still require a certain level of human participation to carry out operations that are not fully autonomous. For example, a parking operation performed by a vehicle that is partially autonomous may necessitate certain actions to be carried out by an individual who is standing on a curb or roadside and remotely controlling the movements of the vehicle via a handheld device.

However, various individuals may use different types of handheld devices for remotely controlling the vehicle. For example, a first individual may use an iPhone® that runs on an iOS® operating system, while a second individual may use a phone that runs on an Android® operating system. Certain performance characteristics and operational features of the two operating systems and/or hardware in the two phones can be different, thereby leading to differences in the way control commands sent from the phones are executed by the vehicle. For example, a timing delay in one of the phones may be unacceptably long and the vehicle may respond to a control command in an undesirable manner even though the vehicle responds correctly to commands issued from the other phone.

It is therefore desirable to provide solutions that address at least some of the inconsistencies associated with the use of different types of handheld devices for remotely controlling an operation of a vehicle.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, this disclosure is generally directed to systems and methods for calibrating a handheld device used for controlling a partially autonomous vehicle. An example method to calibrate the handheld device may include entering a remote-control command into the handheld device for controlling a first action performed by the partially autonomous vehicle. A time-delay associated with one or more operations executed in the handheld device in response to entering the remote-control command are then measured. The time-delay is conveyed to a cloud computing device, which evaluates the time-delay and returns a diagnostic result to the handheld device. Evaluation of the time-delay by the cloud computing device may be carried out by comparing the time-delay in the handheld device to time-delay values obtained via crowdsourcing from other handheld devices. The diagnostic result provided by the cloud computing device may be used by the handheld device for calibration purposes.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a handheld device such as a smartphone, refers to code (software code, typically) that is installed in the handheld device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The phrase "remote-control" as used herein refers to any control action that is taken by any individual who is located outside a vehicle, at any distance. The word "vehicle" as used in this disclosure can pertain to any one of various types of vehicles such as cars, vans, sports utility vehicles, trucks, electric vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle. At least some of the described embodiments are applicable to Level 2 vehicles and may be applicable to higher level vehicles as well.

The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment failures. The level of human intervention is very low. Level 5 (L5) vehicles are fully autonomous vehicles that do not involve human participation.

Figure 1:
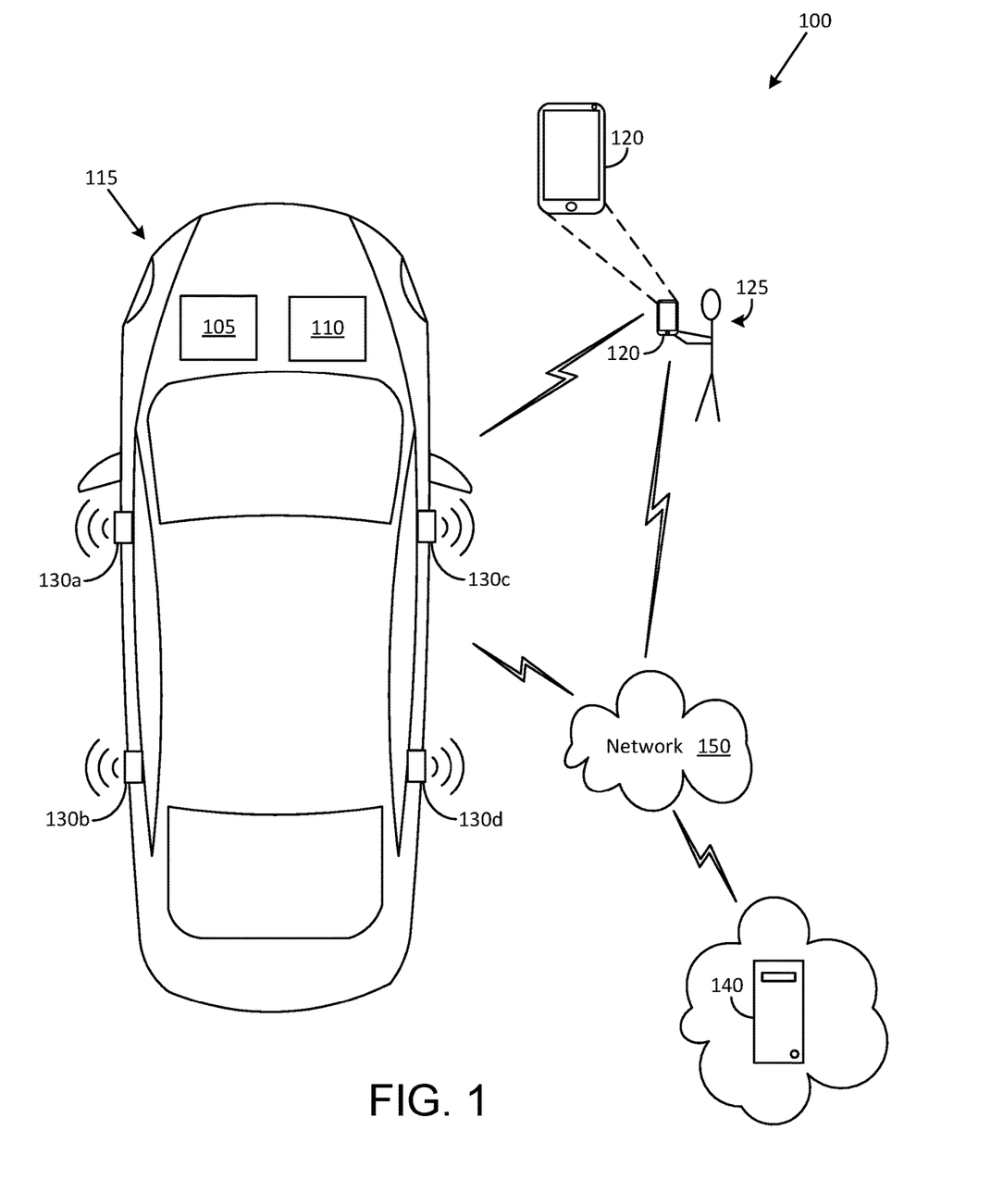
FIG. 1 illustrates an example remote-control system that includes a handheld device configured to transmit remote control commands to a vehicle in accordance with the disclosure.

FIG. 1 illustrates an example remote-control system 100 that includes a handheld device 120 configured to transmit remote control commands to a vehicle 115 in accordance with an embodiment of the disclosure. The vehicle 115 may be one of various types of vehicles such as a gasoline powered vehicle, an electric vehicle, a hybrid electric vehicle, or an autonomous vehicle, that is configured as a Level 2 (or higher) automated vehicle. The remote-control system 100 may be implemented in a variety of ways and can include various type of devices. For example, the remote-control system 100 can include some components that are a part of the vehicle 115, some components that may be carried by an individual 125, and other components that are accessible via a communications network 150. The components that can be a part of the vehicle 115 can include a vehicle computer 105, an auxiliary operations computer 110, and a wireless communication system. Components that may be carried by the individual 125 can include the handheld device 120 such as a smartphone, a display key fob, a tablet computer, or a phablet (phone plus tablet or an iPod Touch®). Components that may be accessible by the vehicle computer 105, the auxiliary operations computer 110, and/or the handheld device 120, via the communications network 150, can include a cloud computing device 140.

The vehicle computer 105 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.).

The auxiliary operations computer 110 may be used to support features such as passive keyless operations, remotely-controlled vehicle maneuvering operations, and remote vehicle monitoring operations. In some cases, some or all of the components of the auxiliary operations computer 110 may be integrated into the vehicle computer 105, which can then execute certain operations associated with remotely-controlled vehicle maneuvering and/or remote vehicle monitoring in accordance with the disclosure.

The wireless communication system can include a set of wireless communication nodes 130a, 130b, 130c, and 130d mounted upon the vehicle 115 in a manner that allows the auxiliary operations computer 110 and/or the vehicle computer 105 to communicate with devices such as the handheld device 120 carried by the individual 125. In an alternative implementation, a single wireless communication node may be mounted upon the roof of the vehicle 115. The wireless communication system may use one or more of various wireless technologies such as Bluetooth®, Ultra-Wideband (UWB), Wi-Fi, ZigBee®, Li-Fi (light-based communication), audible communication, ultrasonic communication, or near-field-communications (NFC), for carrying out wireless communications with devices such as the handheld device 120.

The auxiliary operations computer 110, the vehicle computer 105, and the handheld device 120 can communicate with the cloud computing device 140 via the communications network 150. The communications network 150 may include any one network, or a combination of networks, such as a local area network (LAN), a wide area network (WAN), a telephone network, a cellular network, a cable network, a wireless network, and/or private/public networks such as the Internet. For example, the communications network 150 may support communication technologies such as TCP/IP, Bluetooth®, cellular, near-field communication (NFC), Wi-Fi, Wi-Fi direct, Li-Fi, acoustic or ultrasonic audio communication, Ultra-Wideband (UWB), machine-to-machine communication, and/or man-to-machine communication.

At least one portion of the communications network 150 includes a cellular or Wi-Fi communication link that allows the handheld device 120 to communicate with the cloud computing device 140 for transferring data pertaining to calibrating the handheld device 120 in accordance with the disclosure. The cloud computing device 140 may be a computer that is communicatively coupled to other computers and/or storage devices in the cloud. The cloud computing device 140 is further configured to receive data from various other handheld devices. Data received from the other devices may be used as information by the cloud computing device 140 to perform various operations directed at providing calibration information to the handheld device 120 in accordance with the disclosure.

A software application that may be provided in the handheld device 120, allows the individual 125 to use the handheld device 120 for performing remote-control operations such as, for example, locking and unlocking of the doors of the vehicle 115, and for monitoring some actions performed autonomously by the vehicle 115. One example of an action performed autonomously by the vehicle 115 is a self-parking operation. The handheld device 120 may communicate with the vehicle computer 105 and/or the auxiliary operations computer 110 via one or more of the first set of wireless communication nodes 130a, 130b, 130c, and 130d so as to allow the individual 125 (a driver, for example) to monitor the vehicle 115 when the vehicle 115 is performing the self-parking operation.

The handheld device 120 may also be used by the individual 125 to transmit remote-control commands to control some maneuvers performed by the vehicle 115 during the self-parking operation (referred to in the industry as a Remote Park Assist (RePA) operation) as well as other operations such as a trailer-hitch assist operation (referred to in the industry as a Remote Trailer Hitch Assist (ReTHA) operation) and a trailer maneuvering assist operation (referred to in the industry as a Remote Trailer Maneuver Assist (ReTMA) operation).

The remote-control commands may be initiated by the individual 125 by performing certain actions upon the handheld device 120, such as, for example, activating a soft key on a touchscreen of the handheld device 120, depressing a hard key on the handheld device 120, twirling a knob on the handheld device 120, performing a twirling motion upon the touchscreen of the handheld device 120, or by using a biometric interface of the handheld device 120.

In an example self-parking procedure, the individual 125, who may be driving the vehicle 115, gets out of the vehicle 115 and uses the handheld device 120, which may be an iPhone®, for example, to remotely initiate an autonomous parking procedure of the vehicle 115. During the autonomous parking procedure, the vehicle 115 moves autonomously to park itself at a parking spot located near the individual 125. In one case, the vehicle 115 can be a L2 level vehicle that performs a parking maneuver without human assistance. The individual 125 monitors the movement of the vehicle 115 during the parking maneuver so as to replicate the similar oversight the individual provides when manually driving.

In the example procedure provided above, the handheld device 120 used by individual 125 is an iPhone®. In another example procedure, the handheld device 120 used by individual 125 is a phone that runs on an Android®™ operating system. The iPhone® has certain features that may not be present in the Android® phone, and vice-versa. Consequently, some actions that can be performed on one of the two phones may not be supported on the other phone. Furthermore, the software and hardware inside the iPhone® is typically different than the software and hardware inside the Android® phone. Consequently, even when a similar action is performed on both ones (a touchscreen activation of a softkey, for example), an amount of time taken by one of the phones to process the softkey activation and transmit a command signal to the vehicle 115 may be different than the amount of time taken by the other phone to do the same.

In some cases, a time delay in the smartphone (iPhone®, Android® phone, etc.) may be unacceptably long and the vehicle 115 may react in an undesirable manner. For example, when a command signal from the handheld device 120 takes too long to reach the vehicle 115, the vehicle 115 may stop abruptly.

In some scenarios, the handheld device 120 may not comply with certain industry standards, such as for example, the ISO 26262 standard, titled "Road vehicles—Functional safety." However, the vehicle 115 may conform to the standard and this aspect may be leveraged to calibrate the handheld device 120 in accordance with the disclosure as described below. The calibrating may include, for example, modifying certain operating characteristics of a touchscreen of the handheld device 120 (reducing a response time to a touch, for example), updating a remote-control software application provided in the handheld device 120 in order to rectify a bug in the software application, or modifying the set speed of the vehicle.

Figure 2:
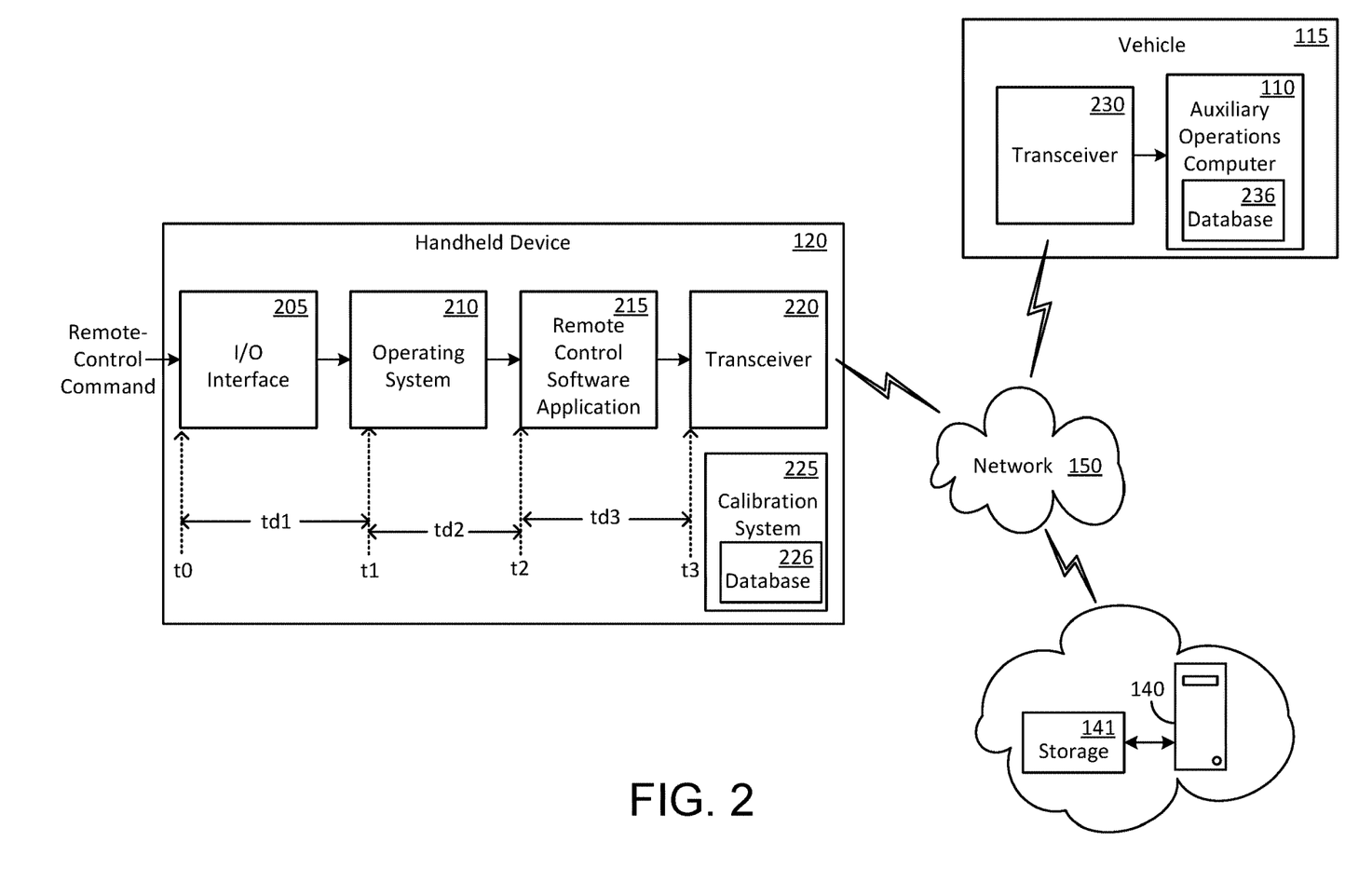
FIG. 2 illustrates some example functional blocks that may be included in a handheld device and in a vehicle in accordance with an embodiment of the disclosure.

FIG. 2 illustrates some example functional blocks that may be included in the handheld device 120 and in the vehicle 115 in accordance with an embodiment of the disclosure. The functional blocks of the handheld device 120 may include an input/output (I/O) interface 205, an operating system (OS) 210, a remote-control software application 215, a transceiver 220, and a calibration system 225. The I/O interface 205, which detects a physical action performed by the individual 125 for entering a remote-control command into the handheld device 120, can be provided in various forms. As such, the I/O interface 205 may incorporate one or more elements such as a touchscreen having softkeys (graphical icons) that can be activated by touching, a hardware component such as hard key that can be activated by a depressing action, a knob that can be rotated (a volume control knob, for example), and a biometric component (such as a camera for facial recognition, a fingerprint scanner, or a microphone for voice command input).

The operating system 210 can be any of various kinds of software used for operating the handheld device 120 such as, for example, an iOS® operating system, an Android® operating system, or a Windows® operating system.

The remote-control software application 215 may be a software application that is downloaded into the handheld device 120 from an app store. One example of the remote-control software application 215 is FordPass™. The remote-control software application 215 may be used to carry out various remote-control operations such as, for example, a vehicle self-parking operation, a trailer-hitch assist operation, and/or a trailer maneuvering assist operation.

The calibration system 225 can include software and hardware that operate to carry out various measurements and other actions for calibrating the handheld device 120 in accordance with the disclosure. In some implementations in accordance with the disclosure, some or all of the software portion of the calibration system 225 may be incorporated into the remote-control software application 215. Some or all of the hardware portion of the calibration system 225 may be already provided in off-the-shelf devices such as an iPhone® or a smartphone running an Android® OS. When not provided, the hardware may be retrofitted into the handheld device 120.

The transceiver 220 can include a wireless transmitter and a wireless receiver that is used to communicate with a transceiver 230 in the vehicle 115 and/or to other devices via the communications network 150. The communications may be carried out by using any of various wireless formats such as, for example, Bluetooth®, Ultra-Wideband (UWB), Wi-Fi, ZigBee®, Li-Fi (light-based communication), audible communication, and ultrasonic communication. The transceiver 230 may be coupled to various components in the vehicle 115, such as, for example, an infotainment system for in-vehicle communications (displaying messages, providing warnings, etc.) and may also be coupled to the wireless communication nodes 130a, 130b, 130c, and 130d for communicating with devices outside the vehicle 115.

The auxiliary operations computer 110 in the vehicle 115 may be configured to operate in cooperation with the remote-control software application 215 and/or the calibration system 225 in the handheld device 120 to execute various operations associated with calibrating the handheld device 120 in accordance with the disclosure.

In an example procedure in accordance with the disclosure, the calibration system 225 may be used to calibrate the handheld device 120 when the handheld device 120 is performing a remote-control operation, such as, for example, a vehicle self-parking operation. In one exemplary case, the handheld device 120 can be calibrated even though the software for performing the vehicle self-parking operation is not provided in the remote-control software application 215 or has been provided and not been used due to various reasons. In such cases, the calibration may be carried out by launching a different application (a trailer-hitch assist operation, for example) and performing a calibration procedure during execution of the trailer-hitch assist operation. The results of the calibration procedure can then be used to calibrate the handheld device 120, followed by using the remote-control software application 215 for performing the vehicle self-parking operation or for updating the remote-control software application 215.

In another exemplary case, the handheld device 120 can be calibrated by executing a first remote-control operation upon the vehicle 115 when the vehicle is stationary (starting an engine of the vehicle 115, locking/unlocking a door of the vehicle 115, etc.) and using the results of the calibration to calibrate the handheld device 120. The calibrated handheld device 120 may then be used to carry out a second remote-control operation upon the vehicle 115. The second remote-control operation may involve moving the vehicle (a self-parking operation, for example).

The calibration procedure performed by the calibration system 225 can be a two-step process in accordance with the disclosure. The first step may involve evaluating various operating characteristics of the handheld device 120 when a remote-control command is entered into the handheld device 120. The evaluation is directed at identifying any inadequacy in the handheld device 120 that may adversely affect use of the handheld device 120 to carry out a remotely-controlled operation upon the vehicle 115. The second step may involve providing an alert to the individual 125 about any inadequacy (if present) and/or rectifying the inadequacy by performing a calibration procedure upon the handheld device 120. The calibration procedure may involve changing operating characteristics of hardware and/or software elements in the handheld device 120, such as the operating range of the vehicle or the vehicle set speed.

In one example implementation of the first step, a remote-control command is entered into the handheld device 120 and the calibration system 225 used to evaluate various timing parameters in the handheld device 120. The various timing parameters may be evaluated by using time stamps and/or by using other methods related to measuring time-related parameters (time delays, propagation times, timing differences, timing tolerances, etc.). When time stamps are used, a first timestamp (t0) may be applied by the calibration system 225 at a moment in time when the remote-control command is recognized by the I/O interface 205, a second time stamp (t1) may be applied at a moment in time when the remote-control command is received and/or recognized by the operating system 210, a third timestamp (t2) may be applied at a moment in time when the operating system 210 responds to the remote-control command and provides an output that is received by the remote-control software application 215, and a fourth timestamp (t3) may be applied at a moment in time when the remote-control software application 215 operates upon the output from the operating system 210 and transmits a signal to the transceiver 220. Timestamps may be applied at various other moments in time for evaluating time parameters associated with the I/O interface 205, the operating system 210, the remote-control software application 215, and/or the transceiver 220.

The timestamps may be evaluated in various ways. In a first method in accordance with the disclosure, the time stamps are compared against reference time stamp values stored in a database 226. The database 226 may be a part of the calibration system 225. In an alternative approach, various time delays that occur in the operating system 210 and the remote-control software application 215 may be compared against reference time delay values stored in the database 226.

In one example implementation, each time delay may be represented in the form of a time period. For example, a first time delay may be represented by a first time period (td1) that corresponds to a time delay in the I/O interface 205, a second time delay may be represented by a second time period (td2) that corresponds to a time delay in the operating system 210 for producing an output in response to the remote-control command, and a third time delay may be represented by a third time period (td3) that corresponds to a time delay in the remote-control software application 215 for producing a signal for transmission in response to the output from the operating system 210.

In some cases, the I/O interface 205 can introduce a number of different time delays depending upon the nature of the component used in the I/O interface 205. For example, the first time period (td1) corresponding to operating a hard key may be different than the first time period (td1) corresponding to operating a softkey on a touchscreen. Furthermore, the first time period (td1) corresponding to various locations on a touchscreen may vary from one location on the touchscreen to another.

The second time delay (td2) introduced by the operating system 210 can vary from one operating system to another. The reference time values stored in the database 226 may be tailored to accommodate the variations in the various operating systems. The third time delay (td3) introduced in the remote-control software application 215 can vary from one remote-control application to another. For example, the third time delay (td3) for executing a remote park assist operation may be different than that for a trailer-hitch assist operation. The difference may be caused by various factors such as, for example, differences in speed of the vehicle 115 when executing the remote park assist operation in comparison to the trailer-hitch assist operation. The reference time values stored in the database 226 may be tailored to accommodate these various operations and may be used when the first step (evaluation) is carried out.

The calibration system 225 may obtain measurement results based on evaluating time-related parameters such as those described above, if the database 226 contains the reference time values needed for performing the evaluation. If successful, the calibration system 225 proceeds to execute the second step that can include providing an alert to the individual 125 about any failure or inadequacy (if present) and rectifying the inadequacy by performing a calibration procedure upon the handheld device 120. The calibration procedure can include operations such as modifying an operational characteristic of the touchscreen, modifying a processing time in the operating system 210 and/or in the remote-control software application, and/or modifying a set speed of the vehicle. In some implementations, the alert may be sent out to the individual 125 based on additional considerations so as to avoid bothering the individual 125 unnecessarily. The additional considerations may be based, for example, on whether the remote-control software application 215 is currently being used to execute a specific remote-control operation or is intended for use to execute a specific remote-control operation in the future.

The description provided above with respect to the two-step process (evaluation and calibration) may be executed successfully when the database 226 in the calibration system 225 of the handheld device 120 contains the reference values. However, in some cases, the database 226 may not contain such information. Consequently, and in accordance with an embodiment of the disclosure, the timing information (time stamps and/or time delays) may be transmitted by the handheld device 120 to the vehicle 115 and/or to the cloud computing device 140.

The timing information may be used by the auxiliary operations computer 110 in the vehicle 115 to perform the evaluation procedure based on data stored in the database 236. The results of the evaluation may be transmitted via the transceiver 230 of the vehicle 115 to the transceiver 220 of the handheld device 120. The calibration system 225 can use the results of the evaluation to execute the second step (calibrating the handheld device 120).

In some cases, a status flag may be used to inform the auxiliary operations computer 110 in the vehicle 115 that the handheld device 120 has failed the first step and may therefore be unsuitable for performing a remote-controlled operation upon the vehicle 115. The use of the status flag may be accompanied by an alert that is displayed on a display screen of the handheld device 120. The individual 125 may see the alert and take action upon the vehicle 115 in a different manner.

In some instances, the auxiliary operations computer 110 in the vehicle 115 may comply with an industry standard, such as for example, the ISO 26262, whereas the handheld device 120 may not be compliant. In such a situation, the handheld device 120 may request the auxiliary operations computer 110 to carry out the first step (evaluation) on behalf of the handheld device 120. The request may be carried out by sending timing information (time stamps, time delay information, etc.) to the auxiliary operations computer 110.

Alternatively, the handheld device 120 may request the cloud computing device 140 to carry out the first step (evaluation) on behalf of the handheld device 120. The cloud computing device 140 may cooperate with a storage element 141 to perform the evaluation procedure. The storage element 141 may contain timing information and other information pertaining to remote-control operations of not just the vehicle 115 but various other vehicles as well. In accordance with an embodiment of the disclosure, the information stored in the storage element 141 is crowd-sourced.

Crowdsourcing can provide a wide variety of information on various subjects from a large number of individuals. The information can include information about various types of vehicles, various operating conditions, and various parameters. For example, a number of individuals who use an iPhone® as the handheld device 120 may provide a first set of timing information that may be different than timing information provided by another number of individuals who use an Android® phone. As another example, a number of individuals may provide timing information based on using a touchscreen to operate the handheld device 120 in a first set of conditions (weather, separation distance between vehicle and a handheld device, lighting conditions, etc.) and another number of individuals may provide the timing information based on using the handheld device 120 in a different set of conditions.

In some cases, operational trends may be accumulated by various handheld devices and stored in the storage element 141 in the form of a time history of instances and locations wherein a timing parameter such as, for example, a time delay in an operating system (td2) has exceeded a predetermined threshold. This information may be used to determine if a particular handheld device is suitable for use in remote-control operations. For example, the individual 125 may be informed that a particular handheld device is unsuitable for use if the time delay (td2) in this type of handheld device has been excessive in greater than 30% of the instances when used. The handheld device may then be denied enrollment. Other such time delay parameters may be also used to determine if a handheld device is suitable for use in executing a remote-control operation. Advanced methods such as a machine learning algorithm may be employed by the cloud computing device 140 to identify whether a particular component or functionality of a handheld device is suitable. The machine learning algorithm may be provided various types of inputs such as, for example, sensor data, weather data, and processes running in a handheld device.

In some cases, a particular handheld device may be denied enrollment with the vehicle 115 when the crowdsourced data indicates that the device is unsuitable due to various reasons in addition to the ones described above. For example, a particular handheld device may be denied enrollment with the vehicle 115 when the crowdsourced data indicates that the device has an unacceptable malfunction rate. The malfunction rate may be deemed unacceptable by comparing against a threshold malfunction rate. As another example, a handheld device may be prevented from being enrolled with the vehicle 115 when the crowdsourced data indicates that the device has failed or offered an unacceptable level of performance over a period of time. The performance of the device may be determined by comparing against various reference values and/or threshold values. For example, a device may be deemed unsuitable for enrollment with a vehicle when the device has failed to execute certain commands consistently over a certain usage period or usage number.

Another aspect that may be addressed by the cloud computing device 140 and used to evaluate a handheld device, pertains to vehicle motion management. For example, an individual such as the individual 125, may be able to use the handheld device 120 to successfully place the vehicle 115 in motion, but excessive time delay in the operating system (td2) 215 may cause the vehicle 115 to stop. The individual 125 may then have to take action to place the vehicle 115 in motion. In some cases, the vehicle 115 may automatically start moving after a delay due to operations executed by the remote-control software application 215.

The storage element 141 may also store various other information pertaining to various handheld devices. Such information may include for example, a serial number of the handheld device 120, version information of the operating system 210, version information of the remote-control software application 215, and hardware information such as specification about a touchscreen in the I/O interface 205. Such information may be used by the cloud computing device 140 to generate historical data and/or statistical data, such as, for example, time and/or frequency of occurrence of certain types of failures or malfunctions.

The description above pertaining to crowdsourcing makes reference to individuals and/or handheld devices providing information to the cloud computing device 140 and/or for storage in the storage element 141. However, a large number of vehicles such as the vehicle 115 that includes the auxiliary operations computer 110, can also provide information to the cloud computing device 140 and/or to the storage element 141 without human involvement. For example, the auxiliary operations computer 110 may automatically transmit the results of the evaluation of the handheld device 120 not only to the handheld device 120 but to the cloud computing device 140 and/or the storage element 141, as well. Consequently, crowdsourcing in accordance with the disclosure can be carried out by individuals as well as devices (handheld devices and vehicles).

Figure 3:
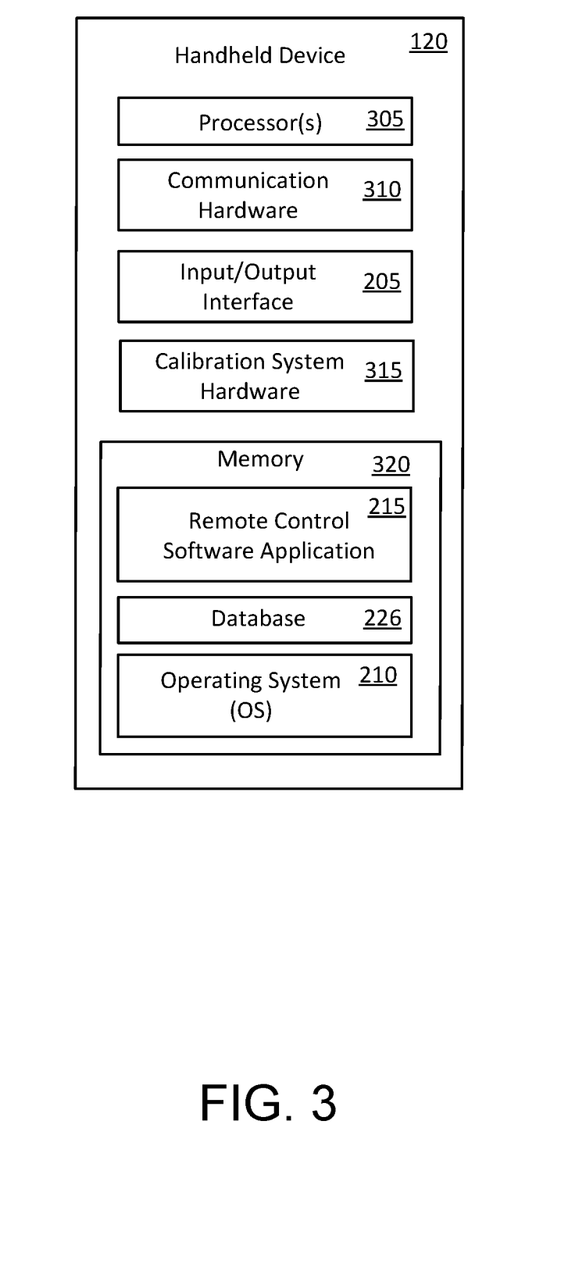
FIG. 3 illustrates some example components that may be included in a handheld device configured to transmit remote control commands to a vehicle, in accordance with an embodiment of the disclosure.

FIG. 3 illustrates some example components that may be included in the handheld device 120 in accordance with an embodiment of the disclosure. The example components include a processor 305, communication hardware 310, I/O interface 205, calibration system hardware 315, and a memory 320. Some of these components may perform functions that are integral to the handheld device 120, such as, for example, handling phone calls and running software applications downloaded from the Google Play store. The components additionally perform functions associated with calibrating the handheld device 120 in accordance with the disclosure.

The communication hardware 310, which can include one or more wireless transceivers such as the transceiver 220, allows the handheld device 120 to transmit and/or to receive various types of signals to/from a vehicle such as the vehicle 115. The communication hardware 310 can also include components for communicatively coupling the handheld device 120 to the communications network 150 for carrying out communications and data transfers with the cloud computing device 140.

The I/O interface 205, which detects a physical action performed by the individual 125 for entering a remote-control command into the handheld device 120, can be provided in various forms, some of which are described above (touchscreen, hard key, etc.).

The calibration system hardware 315 can include various components such as integrated circuits, discrete components, and sensors, which may be employed, for example, when calibrating a touchscreen of the handheld device 120 and/or when carrying out measurements.

The memory 320, which is one example of a non-transitory computer-readable medium, may be used to store the operating system (OS) 210, the database 226, and various code modules such as the remote-control software application 215. The code modules are provided in the form of computer-executable instructions that can be executed by the processor 305 for performing various operations in accordance with the disclosure. More particularly, the remote-control software application 215 may be executed by the processor 305 for carrying out various remote-control operations upon the vehicle 115 (self-parking operation, trailer-hitch assist operation, trailer maneuvering assist operation, etc.). The remote-control software application 215 may also be executed for performing calibration procedures upon the handheld device 120 in accordance with the disclosure.

Figure 4:
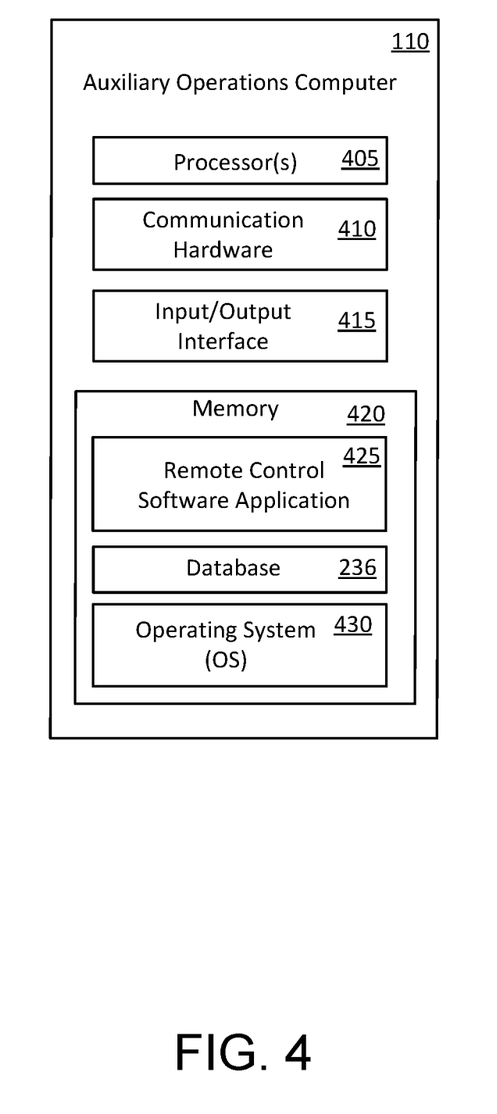
FIG. 4 illustrates some example components that may be included in an auxiliary operations computer of a vehicle, in accordance with the disclosure.

FIG. 4 illustrates some example components that may be included in the auxiliary operations computer 110 in accordance with an embodiment of the disclosure. The example components include a processor 405, communication hardware 410, I/O interface 415, and a memory 420.

The communication hardware 410 can include circuitry that allows the auxiliary operations computer 110 to communicate with the transceiver 230. For example, the communication hardware 410 can include a Bluetooth® transceiver or a UWB transceiver that communicates with the transceiver 230. The communication hardware 410 can also include hardware for communicatively coupling the auxiliary operations computer 110 to the communications network 150 (via the wireless communication nodes 130a, 130b, 130c, and 130d), for carrying out communications and data transfers with the cloud computing device 140.

The I/O interface 415 can include various components in the vehicle 115, such as, for example, an infotainment system, lights, and a beeper.

The memory 420, which is another example of a non-transitory computer-readable medium, may be used to store an operating system (OS) 430, the database 226, and various code modules such as the remote-control software application 425. The code modules are provided in the form of computer-executable instructions that can be executed by the processor 405 for performing various operations in accordance with the disclosure.

More particularly, the remote-control software application 425 may be executed in order to assist the remote-control software application 215 in the handheld device 120 to calibrate the handheld device 120. The assistance may be provided for example, by evaluating various kinds of time-related parameters provided by the remote-control software application 215. Reference time stamp values and reference time delay values for performing the evaluation may be stored in the database 236 or may be obtained by communicating with the cloud computing device 140.

Figure 5:
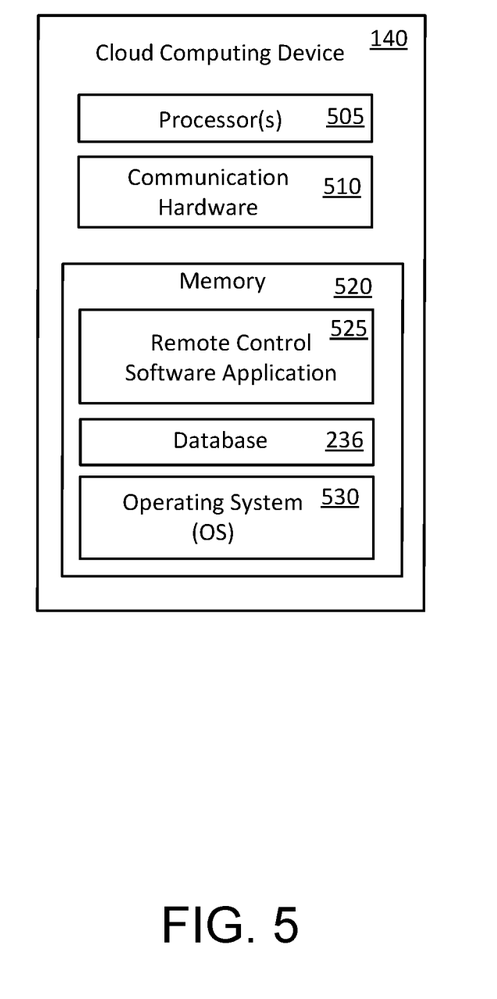
FIG. 5 illustrates some example components that may be included in a cloud computing device, in accordance with the disclosure.

FIG. 5 illustrates some example components that may be included in the cloud computing device 140 in accordance with an embodiment of the disclosure. The example components include a processor 505, communication hardware 510, and a memory 520. The cloud computing device 140 may also include other components that are typically included in a server computer.

The communication hardware 510 can include circuitry that allows the cloud computing device 140 to communicate via the communications network 150, with various devices such as the handheld device 120 and the auxiliary operations computer 110 in the vehicle 115. The communication hardware 510 also allows the cloud computing device 140 to communicate with the storage element 141 for obtaining cloud sourced data to perform various operations in accordance with the disclosure.

The memory 520, which is yet another example of a non-transitory computer-readable medium, may be used to store an operating system (OS) 530 and various code modules such as the remote-control software application 525. The code modules are provided in the form of computer-executable instructions that can be executed by the processor 505 for performing various operations in accordance with the disclosure.

More particularly, the remote-control software application 525 may be configured to cooperate with the remote-control software application 215 in the handheld device 120 and/or the remote-control software application 425 in the auxiliary operations computer 110 of the vehicle 115 for evaluating various kinds of time-related parameters provided by the remote-control software application 215. The evaluation may be carried out by using crowd-sourced information stored in the storage element 141 as described above.

Various other features and actions that may be carried out by the remote-control software application 215 in the handheld device 120 either independently or in cooperation with the remote-control software application 425 in the vehicle 115 and/or the remote-control software application 525 in the cloud computing device 140, are described below.

In an example scenario, the handheld device 120 may not include software for executing a specific operation upon the vehicle 115 such as, for example, a self-parking operation. The remote-control software application 215 in the handheld device 120 may detect the absence of this software and display a first message on a display screen of the handheld device 120 to inquire if the individual 125 would like to download the software. If the individual 125 decides not to download the software at that time, the remote-control software application 215 may display a second message later on under certain circumstances to inform the individual 125 that the self-parking operation is not supported by the handheld device 120. The second message may be displayed for example, when the individual 125 attempts to execute a self-parking operation by using the handheld device 120.

In another example scenario, the remote-control software application 215 in the handheld device 120 may receive a message from the remote-control software application 425 in the vehicle 115 (and/or the remote-control software application 525 in the cloud computing device 140), indicating that the handheld device 120 is not suitable for executing a particular remote-control operation. For example, the message may indicate that a particular model of the handheld device 120 and/or a particular version of the software in the remote-control software application 215 is incompatible for executing the self-parking operation. In some cases, the message may be based on information provided to the vehicle 115 and/or to the cloud computing device 140 by other handheld devices.

In yet another example scenario, the remote-control software application 215 in the handheld device 120 may detect an inconsistency in the handheld device 120 that renders the handheld device 120 unsuitable for carrying out certain remote-control operations. The inconsistencies may be detected independently by the remote-control software application 215 in the handheld device 120 or in cooperation with the remote-control software application 425 in the vehicle 115 and/or the remote-control software application 525 in the cloud computing device 140. Upon detecting the inconsistencies, the remote-control software application 215 may display a warning message to the individual 125 or may display the warning message at a later moment in time.

In some cases, a warning message may be displayed when the individual 125 is attempting to use the handheld device 120 to execute a remote-control operation upon a vehicle that is moving in an inappropriate manner (too fast, too slow, wrong direction, etc.).

In some other cases, a warning message may be displayed on the basis of a combination of events such as, for example, when the processor 305 of the handheld device 120 detects that the I/O interface 205 of the handheld device 120 (a touchscreen, for example) is defective and that the individual 125 is attempting to use the touchscreen to execute a remote-control operation.

In summary, the various example embodiments described above generally pertain to characterizing the performance of a handheld device for executing various remote-control operations, calibrating a handheld device for use to execute various remote-control operations, detecting inconsistencies in hardware and/or software components in the handheld device, and rectifying inconsistencies in hardware and/or software components in the handheld device. In some case, information derived from crowdsourcing can be leveraged for carrying out these operations upon the handheld device.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 320, the memory 420, and the memory 520, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    entering a first remote-control command into a handheld device for controlling a first action performed by a vehicle;
    measuring a first time-delay associated with an operation executed in the handheld device in response to entering the first remote-control command;
    conveying the first time-delay to a cloud computing device;
    receiving from the cloud computing device, a diagnostic result based on an evaluation of the first time-delay; and
    calibrating the handheld device based on the diagnostic result,
    wherein calibrating the handheld device comprises at least one of modifying certain operating characteristics of a touchscreen of the handheld device, updating a remote-control software application provided in the handheld device in order to rectify a bug in the remote-control software application, or modifying a set speed of the vehicle.

2. The method of claim 1, wherein the first remote-control command is entered into the handheld device by one of touching a touchscreen of the handheld device, depressing a key on the handheld device, operating a hardware component of the handheld device, using a biometric feature of the handheld device, or using a voice-operated feature of the handheld device.

3. The method of claim 1, wherein measuring the first time-delay comprises:
    determining a first time period for an operating system in the handheld device to produce a first output in response to entering of the first remote-control command into the handheld device; and
    determining a second time period for a remote-control software application in the handheld device to act upon the first output provided by the operating system and to produce a control signal that is transmitted from the handheld device to the vehicle.

4. The method of claim 1, wherein measuring the first time-delay comprises:
    determining a time difference between a first amount of time consumed by an operating system in the handheld device to produce a first output and a second amount of time consumed by a remote-control software application in the handheld device to act upon the first output and produce a command signal that is transmitted from the handheld device to the vehicle.

5. The method of claim 1, further comprising:
entering a second remote-control command into the handheld device, after calibrating the handheld device, for controlling a second action performed by the vehicle.

6. The method of claim 5, wherein the first action is performed by the vehicle when the vehicle is stationary, and the second action is performed by the vehicle when the vehicle is moving.

7. The method of claim 6, wherein the first action is one of a door lock action or a door unlock action and the second action is a part of a vehicle self-parking operation.

8. A method comprising:
entering a first remote-control command into a first handheld device for controlling a first action performed by a vehicle;
measuring a first time-delay associated with a first operation executed in the first handheld device in response to entering the first remote-control command; and
calibrating the first handheld device,
wherein calibrating the first handheld device comprises at least one of modifying certain operating characteristics of a touchscreen of the first handheld device, updating a remote-control software application provided in the first handheld device in order to rectify a bug in the remote-control software application, or modifying a set speed of the vehicle.

9. The method of claim 8, wherein calibrating of the first handheld device is performed by a cloud computing device, and the method further comprises the cloud computing device determining the first threshold time value based on at least a second time-delay associated with the first operation executed in a second handheld device.

10. The method of claim 8, wherein calibrating of the first handheld device is performed by one of the first handheld device, the vehicle, or a cloud computing device.

11. The method of claim 10, wherein the first time-delay is produced by an operating system in the first handheld device.

12. The method of claim 8, further comprising:
determining from crowdsourced data, a level of performance of the first handheld device;
comparing the level of performance to a threshold performance level; and
denying enrollment of the first handheld device with the vehicle when the level of performance is below the threshold performance level.

13. The method of claim 12, wherein the level of performance is determined by a malfunction rate, a failure rate, and/or a number of failures over a period of time.

14. The method of claim 8, wherein entering the first remote-control command into the first handheld device comprises one of touching a touchscreen of the first handheld device, depressing a key on the first handheld device, operating a hardware component of the first handheld device, using a biometric feature of the first handheld device, or using a voice-operated feature of the first handheld device.

15. A handheld device comprising:
a memory that stores computer-executable instructions; and
a processor configured to access the memory and execute the computer-executable instructions to at least:
detect a first remote-control command that is entered into the handheld device for controlling a first action performed by a vehicle;
measure a set of time-delays associated with operations executed in the handheld device in response to entering the first remote-control command;
convey the set of time-delays to a cloud computing device;
receive from the cloud computing device, a diagnostic result based on an evaluation of the set of time-delays; and
calibrate the handheld device based on the diagnostic result,
wherein calibrating the handheld device comprises at least one of modifying certain operating characteristics of a touchscreen of the handheld device, updating a remote-control software application provided in the handheld device in order to rectify a bug in the remote-control software application, or modifying a set speed of the vehicle.

16. The handheld device of claim 15, wherein measuring the set of time-delays comprises the processor accessing the memory and executing the computer-executable instructions to at least:
determine a first time period for an operating system in the handheld device to produce a first output in response to entering of the first remote-control command into the handheld device; and
determine a second time period for a remote-control software application in the handheld device to act upon the first output provided by the operating system and to produce a control signal that is transmitted from the handheld device to the vehicle.

17. The handheld device of claim 15, wherein measuring the set of time-delays comprises the processor accessing the memory and executing the computer-executable instructions to at least:
determine a time difference between a first amount of time consumed by an operating system in the handheld device to produce a first output and a second amount of time consumed by a remote-control software application in the handheld device to act upon the first output and produce a command signal that is transmitted from the handheld device to the vehicle.

18. The handheld device of claim 15, wherein the processor is further configured to access the memory and execute the computer-executable instructions to at least:
enter a second remote-control command into the handheld device, after calibrating the handheld device, for controlling a second action performed by the vehicle.

19. The handheld device of claim 18, wherein the first action is performed by the vehicle when the vehicle is stationary, and the second action is performed by the vehicle when the vehicle is moving.

20. The handheld device of claim 19, wherein the first action is one of a door lock action or a door unlock action and the second action is a part of a vehicle self-parking operation.

* * * * *